Aug. 1, 1961    C. L. REED, JR    2,994,504
PLUG VALVE

Filed Sept. 4, 1958    2 Sheets-Sheet 1

INVENTOR.
CHARLES L. REED, JR.
BY J. Warren Kinney, Jr.
ATTORNEY

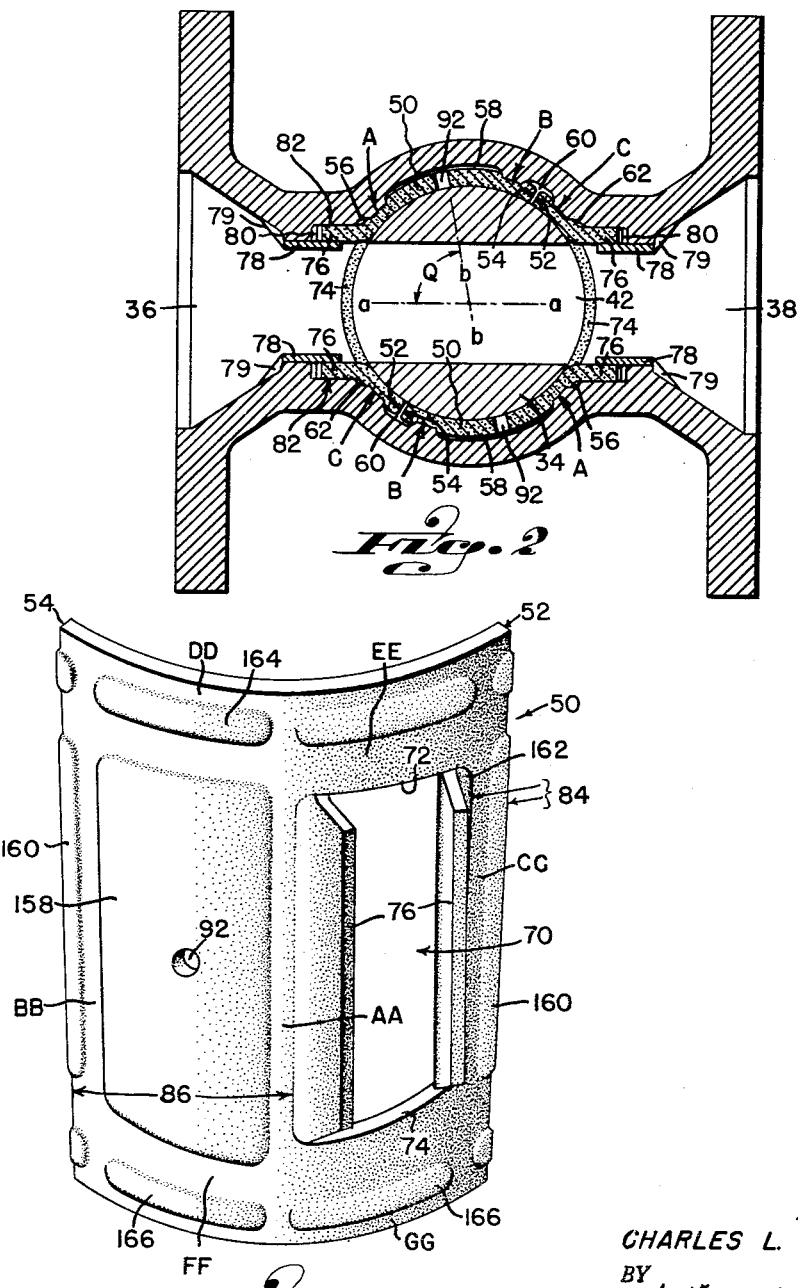

2,994,504
PLUG VALVE
Charles L. Reed, Jr., Cincinnati, Ohio, assignor to Continental Manufacturing Company, Cincinnati, Ohio, a corporation of Ohio
Filed Sept. 4, 1958, Ser. No. 759,010
9 Claims. (Cl. 251—312)

This invention relates to valves, and more particularly to plug valves which are adapted to handle gases and fluids including corrosive fluids.

An object of the invention is to provide a plug valve wherein a novel sleeve is interposed between the adjacent faces of the plug and the plug-receptive-bore of the valve body.

Another object of the invention is to provide a novel two-piece sleeve for a plug valve which includes means to preclude distortion of the sleeves during use of the valve.

A further object of the invention is to provide a plug valve having a sleeve interposed between the plug and the plug-receptive-bore of the valve body, wherein the sleeve is provided with passageways defined by outturned lips formed integral with the sleeves, and which outturned lips are adapted to project into and overlappingly engage portions of the inlet and outlet ports provided in the valve body.

A further object of the invention is to provide a valve body having means therein for effecting a high pressure seal with the adjacent edges of a two-piece sleeve received in the bore of said body.

Still a further object of the invention is to teach a method of securely though releasably anchoring the outturned lips of a sleeve relative to portions of the inlet and outlet ports of a valve body.

Another object of the invention is to provide a plug valve having the hereinabove described characteristics and which includes sleeve members between the plug and valve body which effectively reduce the torque required to turn the plug relative to the body.

A further and very important object of the invention is to provide a valve with a two-piece, semi-circular sleeve between the valving member and valve body wherein the sleeve is provided with outturned lips which co-operate with the inlet and outlet passageways of the valve body and wherein other portions of the sleeve co-operate with certain internally ribbed portions of the valve body for providing areas of high sealing pressure between the sleeve and valve body.

Still a further object of the invention is to provide a sleeve assembly for a plug valve, which assembly is economical to manufacture, install and maintain, and which may be removed and replaced with a minimum of time and expense.

These and other objects are attained by the means described herein and as disclosed in the accompanying drawings in which:

FIG. 2 is a sectional view taken on line 2—2 of FIG. 1.

FIG. 3 is a perspective view of a sleeve segment after having been removed from a completed valve structure.

Figure 1:
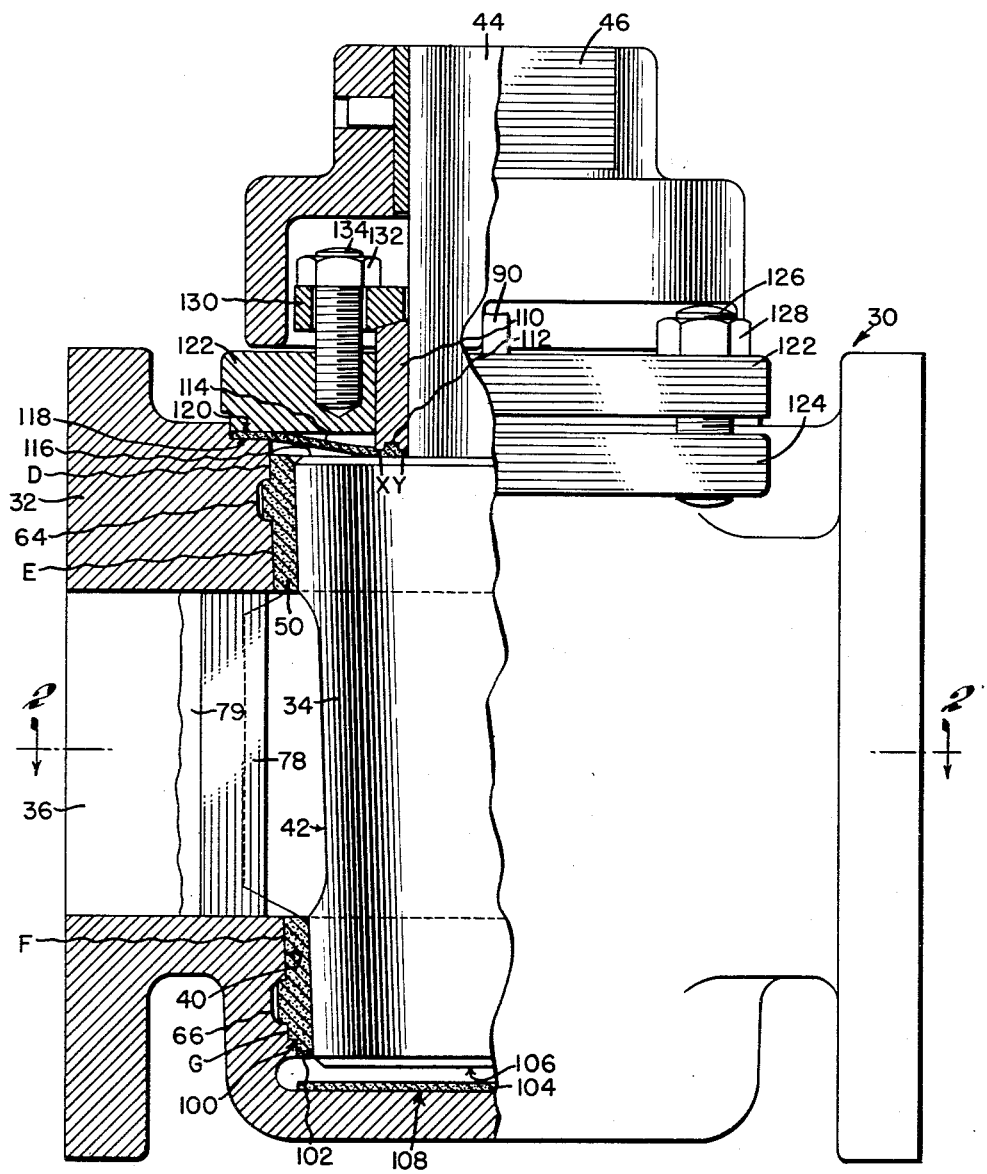
FIG. 1 is a side view of a valve embodying the teachings of the present invention, portions of which have been broken away for clarity of detail and understanding.

With reference now to FIG. 1, the numeral 30 denotes generally a plug valve which may comprise a body portion 32 having a plug or rotatable valving member 34 operably associated therewith. The body member may be provided with an inlet port 36 and an outlet port 38 (FIG. 2) and with a bore 40 which is normal to said ports. Bore 40 may be cylindrical or tapered and it is so arranged as to intersect the inlet and outlet passages 36 and 38.

The valving member or plug 34 is preferably though not necessarily frusto-conical and is provided with an axial port or flow passage 42 which is adapted to be selectively aligned with the inlet and outlet ports for permitting a flow of fluid through the valve; or disaligned therewith for lessening or entirely precluding the flow of material through said ports. A shank 44 projects upwardly from valving member 34, said shank being provided at its upper end with any suitable means such as, by way of example, a recessed socket portion 46 with which an operating lever, not illustrated, may be associated for enabling an operator to apply a turning torque to the valving member 34.

The numeral 50 denotes generally a sealing member or sleeve which is interposed between adjacent faces of valving member 34 and bore 40 of the valve body.

With particular reference now to FIGS. 2 and 3, it will be noted that the sleeve is fabricated in two parts or sections, each of which is substantially semi-circular, whereby the two sections form a substantially complete and continuous annular lining for the bore, except for the spacing at the juncture of the side faces 52 and 54 of the individual sleeve sections.

In the preferred embodiment of the invention, the bore of the valve body is provided with complementary pairs of recessed portions 56, 58, 60 and 62, which are diametrically disposed as illustrated in FIG. 2. These recessed portions result in sets of elongate ribs A, B, and C, which are disposed axially with respect to the bore. The body portion is likewise provided with other recessed portions such as 64 and 66 of FIG. 1, which extend circumferentially with respect to the bore for providing annular ribs D, E, F, and G.

Each of the various ribs A, B, C, D, E, F, and G are adapted to be pressed into the outer face of the sleeve sections incident to the insertion of a sizing plug, not illustrated, into the interior of the sleeve sections whereby high pressure sealing areas between the sleeve and valve body will be established; said high pressure sealing areas being disposed around, in fact, circumscribing, the port areas.

As clearly illustrated in FIG. 2, I have provided two sets of pairs of radial ribs C and B separated by a comparatively narrow recessed portion 60.

The adjacent ends 52 and 54 of the sleeves are located at recessed portions 60 with ribs C engaging and producing high pressure sealing areas adjacent and along side faces 52 of the sleeves, and with ribs B of the other set engaging and producing high pressure sealing areas adjacent and along side faces 54 of the same sleeve. In this manner I have provided a very effective seal adjacent the adjoining edges of the two sleeves.

FIG. 3 effectively illustrates the manner in which the various ribs A, B, C, D, E, F, and G of FIGS 1 and 2 produce high pressure sealing areas in the outer face of the sleeve, said high pressure areas being denoted by double letters, viz., high pressure area AA of the sleeve of FIG. 3 is produced by ribs A, etc. In a similar manner those portions of the sleeve which engage the recessed portions 56, 58, 60, 62, 64 and 66 of the valve body are indicated by the numerals 156, 158, 160, 162, 164 and 166, respectively.

For a more detailed explanation of the technique and theory underlying anchoring of the sleeves in the bore of the valve body, reference is made to the co-pending patent application of Deas Sinkler, Serial No. 628,039 filed December 13, 1956.

In the preferred embodiment of the invention, each of the sleeves is provided with a passageway 70 having an upper edge 72, a lower edge 74, and side edges which are defined by a pair of integral, outturned lips 76.

As illustrated in FIG. 2, lips 76 of one of the sleeve segments project outwardly of the bore and extend into the intake port 36, for thereby providing a smooth, noninterrupted sleeve-lining adjacent the inner end or bore side of the inlet port. The other sleeve is similarly mounted whereby to dispose outturned lips 76 in the outlet 38 of the valve body.

Elongate plates 78 may be fixedly secured to the side walls of the intake and outlet ports whereby to define a vertical channelway 80 into which the ends of lips 76 are received for thereby securely though releasably anchoring the lips relative to the inlet and outlet ports.

In the construction illustrated, it should be understood that the inlet and outlet ports are substantially rectangular in outline, each having upper, lower, and side edges, wherein the side edges may be undercut as at 82 (FIG. 2) to accommodate the ends of lips 76.

With particular reference now to FIG. 3, it will be noted that the passageway 70 in each of the sleeves is located adjacent an edge 52 for providing a relatively narrow strip 84 on one side of the passageway and a relatively wide panel 86 on the other side. The valve member 34 is adapted to be rotated through an arc for disposing its through-port or passageway 42 in axial alignment with the inlet and outlet ports 36 and 38 for effecting a full open condition of the valve. Suitable means are provided, such as a stop member 90 (FIG. 1) for precluding rotation of the plug in a counter-clockwise direction, beyond a full open position. In other words, stop member 90 will compel an operator to rotate the plug in a clockwise direction for closing the valve and for insuring that passageway 42 will, when the valve is closed, engage portions 86 of the sleeve face. In other words, stop 90 will preclude the valving member 34 from being rotated so that passageway 42 could pass over the juncture between the abutting or adjacent edges 52 and 54 of the sleeve segments. Uniformly satisfactory results have been obtained in those instances wherein angle Q, FIG. 2, between full open, when the axis of plug port 42 is on line a—a, and full closed, when the axis of the said plug port is on line b—b, is in the neighborhood of 80°.

The numeral 92 denotes an opening through the low pressure portion of panel 86, said opening permitting equalization of pressure on opposite sides of the said low pressure face for effectively precluding distortion of said sleeve portion inwardly from the position illustrated in FIG. 2 during those periods of time when the valving member has been rotated to a closed position. The opening between the adjacent ends 52 and 54 of the sleeve members also provides a pressure equalizing passageway which effectively eliminates any tendency for the sleeve to become distorted by reason of pressure being built up within the low pressure regions 60.

With reference now again to FIG. 1, it will be noted that in assembling a valve the two sleeve segments are first inserted downwardly into the body with their respective port-defining lips 76 located within channelways 80 and behind plates 78 (FIG. 2). The sleeve segments are then forcibly seated into the body for deforming the sleeve as best illustrated in FIGS. 2 and 3. Such forming may be effected by means of a sizing plug having an externally tapered face similar to that of valving member 34 of the completed valve.

In the preferred embodiment of the invention, an annular abutment 100 is provided in the lower end of the bore, which abutment will be engaged by the lower edge of the sleeve for thereby effectively precluding undue downward movement of the sleeve segment incident to insertion of the sizing plug for properly locating and seating the sleeve segments relative to the valve body. Portions 102 of the sleeves may overflow annular lip 100 incident to the foregoing operation.

In the preferred embodiment of the invention a thrust disk 104 fabricated, by way of example, from a resilient plastic material, is interposed between lower face 106 of the valving member 34 and upper face 108 of the lower end of the valve body.

A gland 110 snugly engages portion 44 of the valving member and, in the preferred embodiment of the invention, the lower end of the gland is provided with a centrally disposed annular recess 112 for providing a pair of depending, laterally spaced, downwardly projecting, concentric sealings rings X and Y, which bear against the upper inner surface of a sealing diaphragm 114, the lower inner surface of which is forced against upper edge 116 of the valving member 34 by the gland for thereby providing a high pressure sealing area. The outer portion of the diaphragm 114 is secured between the adjacent faces 118 and 120 of the valve body and a cover plate 122 which is securely though releasably anchored to portion 124 of the valve body by means of studs 126 and nuts 128.

A gland flange 130 has an inner surface adapted to engage and impart a downward axial thrust to the upper end of gland 110 incident to tightening nut 132 onto stud 134, which threadably engages cover plate 122.

Rotation of the valving member 34 will be limited by reason of stop member, one of which, 90, is illustrated in FIG. 1, it being understood that two such stop members will be utilized, one for limiting the full open position of the valving member relative to the valve body, the other stop member limiting the closed position of the valving member relative to the valve body.

According to the teachings of the present invention, the sleeves may be fabricated from a rigid material such as, by way of example, Monel metal, copper, brass and other similar substances having inherent self-lubricating and anti-galling properties. The sleeves may likewise be fabricated from certain resilient materials such as, by way of example, rubber. However, it is preferred that the sleeves be fabricated from a material characterized by having resilience and elasticity, yet being subject to deformation under load in order to produce a strengthening effect by cold work or orientation in the areas where such strengthening is desired. The material should also be characterized by a low coefficient of friction and, when used with solvents and corrosive substances, is should be characterized by its inertness and resistance to corrosion. The sleeve material should likewise be such as to permit it to be used over wide temperature and pressure ranges.

I have obtained uniformly satisfactory results in those instances wherein the sleeves have been fabricated from materials of the polythylene group, particularly the halogenated ethylenes which are characterized by outstanding resistance to corrosives and solvents and which have extremely low coefficients of friction.

Polytetrafluoroethylene (Teflon) is such a material from which I have fabricated sleeves and thrust disks 104.

From the foregoing, it will be noted that I have thus provided a unique valve structure having a pair of sleeves interposed between adjacent faces of valving member 34 and bore 40 of the valve body, wherein the sleeve portions are secured to the valve body by means of high pressure sealing areas which are arranged in such a manner as to satisfy all of the conditions to which the valve will be subjected in commerce, and particularly when used by the chemical industry for controlling the flow of corrosive fluids.

The structural details of the sleeves and their co-operative relationship with the valve body make it possible for sleeves to be economically and quickly removed and replaced with new sleeves, should the occasion arise.

As illustrated in FIGS. 1 and 2, plates 78 may be permanently affixed to the side walls of the inlet and outlet ports 36 and 38 by means of welding indicated generally by the manual 79. These plates, in conjunction with recessed portions 82 provide simple, foolproof, yet highly effective means for anchoring the ends of outturned sleeve lips 76 relative to the valve housing, thereby rendering the valve particularly effective and efficient for handling fluids moving at high velocities. The presence of the integral outturned lips precludes undercutting of the sleeve 50 at or adjacent the inlet and outlet ports and they also facilitate smooth action of the valving member 34.

Various changes and modifications may be made in the structural details of the device within the scope of the appended claims, without departing from the spirit of the invention.

What is claimed is:

1. In a plug valve, a valve body having substantially rectangular inlet and outlet ports each having top, bottom and side edges and a bore normal to said ports, a sleeve in said bore, said sleeve having substantially rectangular inlet and outlet passageways each including top, bottom and side edges wherein only said side edges are defined by outturned lips which project beyond said bore and terminate interiorly of only the side edges of corresponding ports in said valve body.

2. In a plug valve, a valve body having diametrically aligned rectangular shaped inlet and outlet ports each having top, bottom and side edges and a bore normal to said ports, a two-piece sleeve in said bore wherein each sleeve piece including a rectangular passageway having top, bottom and side edges, and wherein only said side edges are defined by outturned lips projecting beyond and seated within the sides of a port of said valve body.

3. A plug valve as described in claim 2 wherein means secured to and carried by the ports of said body overlie and project inwardly beyond the ends of the lips of said sleeve.

4. In a plug valve, a valve body having rectangular, diametrically aligned, inlet and outlet ports each having inner and outer ends, and a bore normal to the inner ends of said ports, a pair of substantially semi-cylindrical sleeve elements in said bore, each of said sleeve elements including top, bottom and side edges and a rectangular passageway defined by top and bottom edges, spaced from the top and bottom edges of a sleeve, and a pair of outturned side lips wherein the said passageway through each sleeve element is disposed adjacent a side edge thereof for providing a narrow strip on one side of the passageway and a wide panel on the other side thereof, the outturned lips of one of said sleeve elements projecting into and overlying only the side edges of the inner end of said inlet port, the outturned lips of the other sleeve projecting into and overlying only the side edges of the inner end of said outlet port, the narrow strip of one sleeve being located adjacent the wide panel of the other sleeve whereby said wide panels will alternate with said strips and be located on the same side of their respective passageways for providing a pair of continuous, diametrically aligned sealing surfaces immediately adjacent said passageways.

5. In a plug valve, a valve body having a plug-receptive bore therein, a two-piece sleeve lining said bore, and pairs of elongate, laterally spaced, axially disposed sealing ribs integral with said valve body, wherein the ribs of each pair engage said sleeves adjacent and on opposite sides of their adjoining edges.

6. In a plug valve, a valve body having a plug-bore therein, a two-piece sleeve lining said bore, two pairs of elongate, laterally spaced axially disposed sealing ribs integral with said valve body, wherein the ribs of each pair engage portions of both sleeves adjacent but spaced from their respective adjoining edges for providing pairs of laterally spaced high pressure sealing areas on opposite sides of the adjoining edges of the sleeves and providing zones of lesser sealing pressure between the ribs of each pair.

7. In a plug valve, a valve body having diametrically aligned, inlet and outlet ports each having inner and outer ends, and a bore normal to the inner ends of said ports, a pair of substantially semi-cylindrical sleeve elements in said bore, each of said sleeve elements including side edges and a port-passageway disposed adjacent a side edge thereof for providing a narrow strip on one side of the passageway and a wide panel on the other side thereof, two pairs of elongate ribs integral with said body wherein the ribs of each pair is laterally spaced and extend axially along the sides of said bore on one side of a port, one of the ribs of each pair in engagement with the narrow strip of one sleeve with the other rib of each pair in engagement with the wide panel of the other sleeve, said ribs engaging said sleeves at locations adjacent but spaced from the adjoining side edges of the wide panels and narrow strips of the respective sleeves, said ribs providing high pressure sealing areas along and on opposite sides of the juncture of said sleeve elements.

8. In a plug valve, a valve body having a plug-bore therein, two semi-cylindrical sleeves lining said bore, two pair of elongate, laterally spaced, axially disposed, sealing ribs integral with said valve body engaging portions of both sleeves adjacent their respective adjoining edges for providing pairs of localized high pressure sealing areas on opposite sides of the adjoining edges of the sleeves and zones of reduced pressure between said ribs.

9. In a plug valve, a valve body having inlet and outlet ports each having inner and outer ends, and a bore normal to the inner ends of said ports, a pair of substantially semi-cylindrical sleeves in said bore, each of said sleeves including side edges and a port-passageway disposed adjacent one side edge thereof for providing a narrow strip on one side of the passageway and a wide panel on the other side thereof, two pair of elongate axially disposed ribs integral with said body, one rib of each pair in engagement with the side edge of said narrow strips, the other rib of each pair in engagement with the side edges of said wide panels for providing high pressure sealing areas along and on opposite sides of the juncture of said sleeve elements with zones of reduced pressure between said ribs, said wide panels having apertures therethrough interconnecting said zones of reduced pressure with the other face of said panels.

References Cited in the file of this patent

UNITED STATES PATENTS

| 461,084 | Pratt | Oct. 13, 1891 |
| 477,606 | Pratt | June 21, 1892 |
| 2,728,550 | Sinkler | Dec. 27, 1955 |
| 2,813,695 | Stogner | Nov. 19, 1957 |
| 2,913,219 | Freed | Nov. 17, 1959 |

FOREIGN PATENTS

| 13,188 | Great Britain | of 1850 |
| 8,858 | Great Britain | of 1885 |
| 275,427 | Great Britain | Aug. 11, 1927 |
| 475,316 | Canada | July 17, 1951 |

Notice of Adverse Decision in Interference

In Interference No. 92,564 involving Patent No. 2,994,504, C. L. Reed, Jr., Plug valve, final judgment adverse to the patentee was rendered July 2, 1964, as to claim 1.

[*Official Gazette August 25, 1964.*]